US012807324B2

(12) United States Patent
Czapla et al.

(10) Patent No.: US 12,807,324 B2
(45) **Date of Patent: *Nov. 24, 2026**

(54) INSTALLATION FOR AN AIRCRAFT, HAVING A TANK DELIMITING A VOLUME WITH A HIGH POINT AND AN ELEMENT CONTAINING DIHYDROGEN

(71) Applicants: Airbus SAS, Blagnac (FR); Airbus Operations SAS, Toulouse (FR)

(72) Inventors: Lionel Czapla, Toulouse (FR); Jonathan Landolt, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 19/295,927

(22) Filed: Aug. 11, 2025

(65) Prior Publication Data

US 2026/0048850 A1 Feb. 19, 2026

(30) Foreign Application Priority Data

Aug. 14, 2024 (FR) ........................................ 2408911

(51) Int. Cl.
*B64D 37/34* (2006.01)
*B64C 3/34* (2006.01)
*B64D 37/06* (2006.01)
*B64D 37/30* (2006.01)

(52) U.S. Cl.
CPC ................ *B64D 37/30* (2013.01); *B64C 3/34* (2013.01); *B64D 37/06* (2013.01); *B64D 37/34* (2013.01)

(58) Field of Classification Search
CPC ........ B64D 37/06; B64D 37/34; B64D 37/30; B64C 3/34
See application file for complete search history.

(56) References Cited

U.S. PATENT DOCUMENTS

2014/0255733 A1* 9/2014 Masset .............. H01M 8/04022 429/408
2016/0159492 A1* 6/2016 Filangi, Jr. .............. B60L 50/72 244/58
2023/0077242 A1* 3/2023 Emerson ................ B64D 37/32
2024/0158095 A1* 5/2024 Milliere ............ H01M 8/04201

FOREIGN PATENT DOCUMENTS

EP 4147978 A1 3/2023
FR 3140867 A1 4/2024
GB 2624873 A 6/2024

OTHER PUBLICATIONS

French Search Report for corresponding French Patent Application No. 2408911 dated Feb. 5, 2025.

* cited by examiner

*Primary Examiner* — Tye William Abell
(74) *Attorney, Agent, or Firm* — Greer, Burns & Crain, Ltd.

(57) ABSTRACT

An installation for an aircraft having a tank delimiting a volume with a high point, through a wall of the tank, an evacuation channel arranged near the high point, a container in which dihydrogen is present and which is arranged in the volume, and a catalyzer configured to catalyze an oxidation reaction of the dihydrogen with the air in the tank, wherein the catalyzer is fastened at the evacuation channel.

7 Claims, 1 Drawing Sheet

INSTALLATION FOR AN AIRCRAFT, HAVING A TANK DELIMITING A VOLUME WITH A HIGH POINT AND AN ELEMENT CONTAINING DIHYDROGEN

CROSS-REFERENCES TO RELATED APPLICATIONS

This application claims the benefit of French Patent Application Number FR2408911 filed on Aug. 14, 2024, the entire disclosure of which is incorporated herein by way of reference.

FIELD OF THE INVENTION

The invention relates to the field of aircraft in which a circuit of pipes, pumps, tanks, etc. for dihydrogen is arranged. The invention relates more particularly to an installation having a tank that delimits a volume in which is disposed an element containing dihydrogen and where, in the volume, there is arranged a material that catalyzes an oxidation reaction of the dihydrogen with the ambient air in order to oxidize dihydrogen. The invention also relates to an aircraft having at least one such installation.

BACKGROUND OF THE INVENTION

As is known, dihydrogen may constitute an alternative to petroleum in the propulsion of vehicles, in particular of aircraft. To this end, an aircraft has a dihydrogen tank that supplies a fuel cell so as to generate electricity that powers an electric motor, or, directly, an engine that consumes the dihydrogen.

The aircraft then has a network of pipes, pumps and other elements through which the dihydrogen passes. For safety reasons and in order to limit the risk of dihydrogen leaks, it is known to use double-skinned pipes, for example.

Some of these elements are installed in tanks that have inlets/outlets for the dihydrogen. This enclosure of these elements in a tank makes it possible to ensure additional retention of the dihydrogen in the event of a leak inside the tank. Although such an arrangement makes it possible to have a sufficient level of safety, it may be useful to provide another arrangement that limits the risk of concentrations of dihydrogen in the aircraft and more particularly in the tank.

SUMMARY OF THE INVENTION

An object of the present invention is to propose an installation for an aircraft, having a tank that delimits a volume in which is disposed an element containing dihydrogen and where, in the volume, there is arranged a material that catalyzes an oxidation reaction of the dihydrogen with the ambient air in order to oxidize dihydrogen.

For this purpose, there is proposed an installation for an aircraft, said installation having:

- a tank delimiting a volume with a high point,
- through a wall of the tank, an evacuation channel arranged near the high point,
- a container in which dihydrogen is present and which is arranged in the volume, and
- a catalyzer intended to catalyze an oxidation reaction of the dihydrogen with the air in the tank, wherein the catalyzer is fastened at the evacuation channel.

With such an arrangement, the dihydrogen is consumed, and this prevents the excessive concentration thereof.

Advantageously, the volume has a low point and the installation has, at the low point, a drying-out channel arranged through a wall of the tank to evacuate liquid water from the volume.

Advantageously, the installation has an additional catalyzer intended to catalyze an oxidation reaction of the dihydrogen with the air in the tank, wherein the additional catalyzer is fastened at the drying-out channel.

Advantageously, the installation has, through a wall of the tank, an introduction channel arranged to introduce air into the volume.

Advantageously, the installation has an additional catalyzer intended to catalyze an oxidation reaction of the dihydrogen with the air in the tank, wherein the additional catalyzer is fastened at the introduction channel.

Advantageously, the installation has, for the or each catalyzer, a temperature sensor arranged to measure the temperature of said catalyzer.

According to a particular embodiment, the or each catalyzer is constituted of a layer of a catalytic substance deposited:

- on an inner face of the tank around the mouth of each channel, and/or
- on an inner wall of each channel near the mouth of said channel.

According to a particular embodiment, the or each catalyzer is constituted of a support covered with a catalytic substance, wherein the support is:

- fastened inside the tank around each channel, and/or
- at the mouth of each channel.

The invention also proposes an aircraft having at least one installation according to one of the preceding variants.

BRIEF DESCRIPTION OF THE DRAWINGS

The above-mentioned features of the invention, along with others, will become more clearly apparent upon reading the following description of at least one exemplary embodiment, said description being given with reference to the appended drawings, in which.

DETAILED DESCRIPTION OF THE PREFERRED EMBODIMENTS

Figure 1:
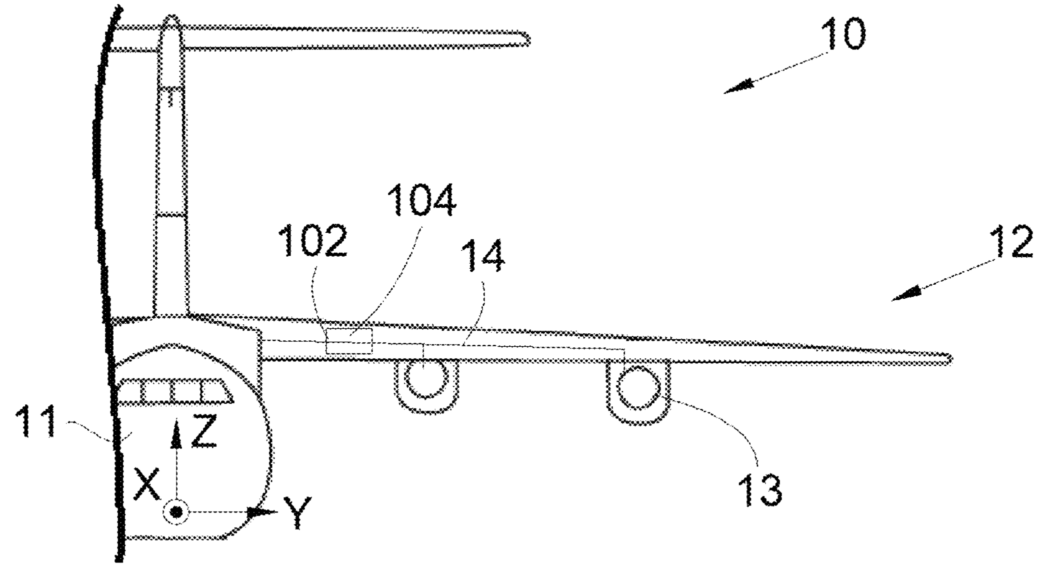
FIG. 1 is a front view in cross section of an aircraft in which an installation according to the invention is implemented.

FIG. 1 shows an aircraft 10 that has a fuselage 11 and, on either side of the fuselage 11, a wing 12. The aircraft 10 has engines 13 that are supplied with dihydrogen via pipes 14 from a dihydrogen tank that is disposed, for example, in the fuselage 11.

The dihydrogen is used to carry out combustion in the engine 13 or to supply a fuel cell present in the vicinity of the engine 13 that is then supplied with electricity from this fuel cell.

In order to allow dihydrogen to be provided along the wing 12 and as far as each of the engines 13, the aircraft 10 has, generally speaking, pipes 14, pumps 14*a* and any other necessary device. These elements are hereinafter referred to as "containers 106" and dihydrogen is present in each of them.

The aircraft 10 has a certain number of tanks 102 that are distributed in the aircraft 10 and for example in FIG. 1 in the wing 12. The tank 102 delimits a volume 104 that is more or less fluidtight with respect to the dihydrogen and which, in any case, as a result of its design delimits a volume 104 in which the dihydrogen can accumulate.

Figure 2:
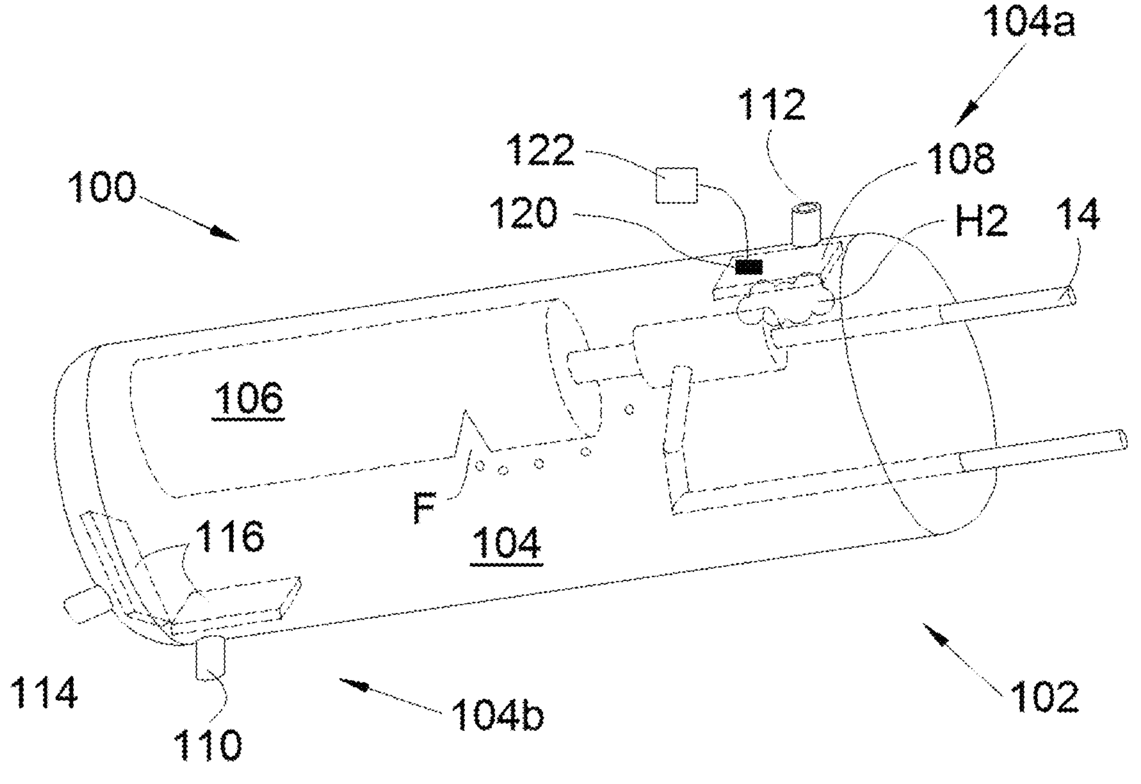
FIG. 2 is a side view of an installation according to the invention.

FIG. 2 shows the tank 102, which has an elongate shape.

FIG. 2 shows an installation 100 according to the invention, which has the tank 102. Although this embodiment is based on a tank 102 housed in the wing 12, the invention applies in the same way to any other tank disposed elsewhere in the aircraft 10. The aircraft 10 may have a plurality of installations 100 distributed at various locations.

The installation 100 also has at least one container 106 that is arranged in the volume 104, as specified above, the container 106 can be any element or set of elements containing dihydrogen, such as a pump, a heat exchanger, a pipe 14 etc.

The volume 104 has a high point 104*a* at which dihydrogen H2 is likely to accumulate in the event of a leak F at the container 106 and in order to limit the concentration of dihydrogen at the high point 104*a*, the installation 100 has, through a wall of the tank 102, an evacuation channel 112 that is arranged at the high point 104*a*.

The installation 100 also has a catalyzer 108 that is intended to catalyze an oxidation reaction of the dihydrogen with the air in the tank 102. The dihydrogen is thus oxidized to form water.

In order to transform as much dihydrogen as possible, the catalyzer 108 is fastened, in this case, in the volume 104 at the evacuation channel 112, i.e., in this case in the vicinity of the high point 104*a*. The position of the catalyzer 108 at the evacuation channel 112 is such that the accumulated dihydrogen H2 necessarily comes into contact with the catalyzer 108 when it is evacuated.

The catalyzer 108 is, for example, constituted of a support, such as a grille, a plate, etc., covered with a suitable catalytic substance such as alumina and/or cerium oxide and/or a platinoid (platinum, palladium, platinum dioxide).

In general, in the case of a catalyzer 108 in the form of a support, the catalyzer 108 is arranged between the evacuation channel 112 and the container 106 and the passage through the catalyzer 108 is promoted when the latter is gas-permeable and takes the form, for example, of a grille on which the catalytic substance is deposited.

The catalyzer 108 can also be a layer of a catalytic substance such as a paint.

According to the configuration of the tank 102, the consumption of dihydrogen and dioxygen will lead to a drop in pressure in the volume 104 if the latter is hermetic, but the dioxygen will be replaced if the volume 104 is not hermetic. However, in all cases, the consumption of the dihydrogen will decrease the proportion thereof in the volume 104.

In order to evacuate the water thus formed, a drying-out channel 110 can be arranged at a low point 104*b* of the volume 104. The drying-out channel 110 thus passes through a wall of the tank 102 and ensures the evacuation of the liquid water from the volume 104.

In addition, in order to improve the arrival of dioxygen in the volume 104 when the latter is excessively fluidtight, the installation 100 has, through a wall of the tank 102, an introduction channel 114 that makes it possible to introduce air into the volume 104.

The introduction channel 114 is in this case at the low point 104*b*, but it can be at another location.

As a result of the movements of the aircraft 10 during a flight, and of the differences in pressure between the volume 104 and the outside of the tank 102, air and/or dihydrogen can be caused to leave the volume 104 via the introduction channel 114 or the drying-out channel 110.

In order for the dihydrogen leaving the volume 104 via the introduction channel 114 or the drying-out channel 110 to also be transformed, the installation 100 has an additional catalyzer 116 intended to catalyze an oxidation reaction of the dihydrogen with the air in the tank 102. This additional catalyzer 116 is then fastened in the volume 104 at the introduction channel 114 and/or the drying-out channel 110.

The additional catalyzer 116 can take the same form and the same composition as the catalyzer 108, i.e., either a support covered with a catalytic substance, or a layer of a catalytic substance.

In the case of a support covered with a catalytic substance, the or each support is fastened inside the tank 102 at the high point 104*a* and/or at the mouth of each channel 112, 110, 114. According to one particular embodiment, the support is fastened in the volume 104 between the container 106 and the mouth of the channel in question in the wall of the tank 102. According to another particular embodiment, the support is fastened to the outside of the tank 102 at the outlet of the channel in question. More particularly, the or each support is fastened inside the tank 102 around the channel 112, 110, 114 in question and/or at the mouth of the channel 112, 110, 114 in question.

In the case of a layer of a catalytic substance, the or each catalyzer 108, 116 is deposited on an inner face of the tank 102 at the high point 104*a* and/or around each channel 112, 110, 114, in particular on the inner face of the tank 102 around the mouth of the channel in question in the wall of the tank 102.

In addition or as an alternative, in the case of a layer of a catalytic substance, the or each catalyzer 108, 116 is deposited on an inner wall of each channel 112, 110, 114 near the mouth of said channel 112, 110, 114.

The temperature of the catalyzer 108, 116 is a function, inter alia, of the quantity of dihydrogen that has been oxidized because this oxidation reaction is exothermic. Thus, by monitoring the temperature of each catalyzer 108, 116 of the aircraft 10, it is possible to assume that dihydrogen is present or absent at each catalyzer 108, 116.

To this end, the installation 100 has, for each catalyzer 108, 116, a temperature sensor 120, for example a thermocouple, which is mounted, for example, against the catalyzer 108, 116 and which measures the temperature of said catalyzer 108, 116.

This information is then transmitted to a control unit 122 which, as a function of the information received and by comparing it to a reference temperature interval, can deduce that dihydrogen is present or absent at each catalyzer 108, 116. On that basis, it can inform the personnel of a possible dihydrogen leak F in the aircraft 10.

The control unit 122 constitutes a hardware platform that has, connected by a communication bus: a processor or CPU (central processing unit); a random-access memory (RAM); a read-only memory, for example of the ROM (read-only memory) or EEPROM (electrically erasable programmable ROM) type; a storage unit, such as a hard disk drive (HDD) or a storage medium reader, such as an SD (secure digital) card reader; and an interface manager in connection with each temperature sensor 120 and an interface for communication with the personnel.

The processor is capable of executing instructions loaded into the random-access memory from the read-only memory, from an external memory, from a storage medium (such as an SD card), or from a communication network. When the control unit 122 is powered up, the processor is capable of reading instructions from the random-access memory and executing them. These instructions form a computer program that causes the implementation, by the processor, of all or some of the steps and operations described here.

All or some of the steps and operations described here can thus be implemented in software form by executing a set of instructions using a programmable machine, for example a processor of DSP (digital signal processor) type or a micro-controller, or be implemented in hardware form by a machine or a dedicated electronic component (chip) or a dedicated set of electronic components (chipset), for example an FPGA (field-programmable gate array) or ASIC (application-specific integrated circuit) component. In general, the hardware platform has electronic circuitry adapted and configured to implement the operations and steps described here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An installation for an aircraft, said installation having:

a tank delimiting a volume that has a high point and a low point;

an evacuation channel arranged proximate the high point and extending through a wall of the tank;

a container in which dihydrogen is present and which is arranged in the volume;

a catalyzer configured to catalyze an oxidation reaction of the dihydrogen with air in the tank, wherein the catalyzer is fastened at the evacuation channel;

a drying-out channel arranged through a wall of the tank, at the low point, to evacuate liquid water from the volume; and, an additional catalyzer configured to catalyze an oxidation reaction of the dihydrogen with the air in the tank, wherein the additional catalyzer is fastened at the drying-out channel.

2. The installation as claimed in claim 1, wherein for each catalyzer, a temperature sensor is provided to measure a temperature of a catalyzer.

3. The installation as claimed in claim 1, wherein each catalyzer comprises a layer of a catalytic substance deposited on an inner face of the tank around a mouth of each channel, or on an inner wall of each channel proximate the mouth of said channel, or on both.

4. The installation as claimed in claim 1, wherein each catalyzer comprises a support covered with a catalytic substance, wherein the support is fastened inside the tank around each channel, or at a mouth of each channel, or at both positions.

5. The installation as claimed in claim 1, further comprising:

an introduction channel extending through a wall of the tank and configured to introduce air into the volume.

6. The installation as claimed in claim 5, further comprising:

a third catalyzer configured to catalyze an oxidation reaction of the dihydrogen with the air in the tank, wherein the third catalyzer is fastened at the introduction channel.

7. An aircraft comprising:

at least one installation as claimed in claim 1.

* * * * *